United States Patent
Chou

(10) Patent No.: US 7,551,416 B2
(45) Date of Patent: Jun. 23, 2009

(54) POWER SUPPLY EQUIPPED WITH AN INDEPENDENT OVERLOAD PROTECTION MECHANISM

(75) Inventor: Ching-Ling Chou, Taipei Hsien (TW)

(73) Assignee: Topower Computer Industrial Co., Ltd., Xindian (TW)

( * ) Notice: Subject to any disclaimer, the term of this patent is extended or adjusted under 35 U.S.C. 154(b) by 75 days.

(21) Appl. No.: 11/217,366

(22) Filed: Sep. 2, 2005

(65) Prior Publication Data

US 2007/0053125 A1    Mar. 8, 2007

(51) Int. Cl.
H02H 3/00 (2006.01)
H02H 3/12 (2006.01)
(52) U.S. Cl. .................... 361/78; 361/93.9; 361/20
(58) Field of Classification Search .............. 361/78, 361/93.9, 20
See application file for complete search history.

(56) References Cited

U.S. PATENT DOCUMENTS

| 4,156,273 A * | 5/1979 | Sato .................. 363/21.16 |
| 5,423,045 A * | 6/1995 | Kannan et al. ............. 713/322 |
| 5,442,534 A * | 8/1995 | Cuk et al. ................. 363/16 |
| 5,737,209 A * | 4/1998 | Stevens .................. 363/143 |
| 5,768,117 A * | 6/1998 | Takahashi et al. ............ 363/65 |
| 6,567,708 B1 * | 5/2003 | Bechtel et al. .............. 700/19 |
| 6,717,389 B1 * | 4/2004 | Johnson ................. 323/282 |
| 7,151,356 B1 * | 12/2006 | Chen ..................... 320/107 |

* cited by examiner

Primary Examiner—Stephen W Jackson
Assistant Examiner—Zeev Kitov
(74) Attorney, Agent, or Firm—Apex Juris, pllc; Tracy M Heims

(57) ABSTRACT

A power supply equipped with an independent overload protection mechanism includes a control circuit and a transformation circuit that form multiple sets of combination circuits for transforming AC power to DC power. Each control circuit is connected to a protection circuit which monitors overload operation conditions of an electronic device. In the event that an overload condition occurs, the protection circuit outputs an individual protection signal to the control circuit to stop or suspend power output on a DC power cord so that the electronic device at the rear end is not driven. Hence an independent overload protection can be achieved.

5 Claims, 5 Drawing Sheets

POWER SUPPLY EQUIPPED WITH AN INDEPENDENT OVERLOAD PROTECTION MECHANISM

FIELD OF THE INVENTION

The present invention relates to a power supply equipped with an independent overload protection mechanism and particularly to a power supply equipped with an overload protection mechanism adopted for use on electronic devices to provide independent monitoring of individual electronic device operation conditions and individually offer an overload protection mechanism.

BACKGROUND OF THE INVENTION

These days user's demand for more powerful computer systems grows constantly. Power supply requirements of CPU and peripherals also increase. The power supply used in the computer system also has to provide a greater power output. However, due to the concern of the possible harmful effect to human body, there is an energy limitation for the output power of power supply (maximum output power (Max VA) specification at present is mostly 240 VA. For example, with output of 12V, the maximum output current is 20 A). For instance, in SSI or UL standards, there is an Energy Hazard standard for the power supply of electric equipment. The maximum output power of the power supply is 240 VA to protect the safety of the general computer users.

Refer to FIG. 1 for the overload protection technique now adopted by the conventional power supply. The power supply receives AC power 10 and has commutation filter circuits 21 and 22 and a transformation circuit 31 to transform the AC power to a plurality of DC powers to drive at least one electronic device 81 at the rear end. The transformation circuit 31 outputs DC power of different voltage levels according to different coil number ratios on the secondary side. There is a control circuit 41 (consisting of a power switch 411 and a pulse-width modulation (PWM) controller 413) connecting to a driving signal source on the front side of the transformation circuit 31. The protection mechanism captures a power use value on the DC power cord input to the electronic device 81 and sends the power use value to a protection circuit 71. The protection circuit 71 provides a preset over-voltage protection value in a constant current or constant voltage mode to be compared with the power use value. If the power use value is greater than the over-voltage protection value, the protection circuit 71 outputs the comparison value to the power switch 411 or PWM controller 413 to stop or suspend power output on the DC power cord that drives the electronic device 81 at the rear end. Thus the object of the overload protection mechanism for the power supply is achieved.

However, nowadays the operation speed of computer system increases very fast, and the number of electronic devices connected to the computer system also increases constantly, abnormal overload condition could happen to one of the electronic devices. In such an occasion, the power supply immediately stops all power output. If the overloaded electronic device is a storage device or other peripheral (such as a backup hard disk or optical disk drive), operation of the computer system does not have to be stopped immediately. Moreover, when the power supply stops power output and causes shutdown of the computer system, users do not know which electronic device is overloaded. Users have to send the entire computer system for repairs. It is troublesome.

SUMMARY OF THE INVENTION

Therefore the primary object of the present invention is to solve the aforesaid disadvantages. The invention provides a power supply which changes the control circuit and transformation circuit that transform AC power to DC power to a multi-circuit design. Each control circuit is connected to a protection circuit to monitor overload operation condition of the electronic device. The protection circuit can output an individual protection signal to the control circuit in the event of overload condition to stop or suspend power output on the DC power cord so that the electronic device at the rear end is nor driven. Thus the power supply has an independent overload protection mechanism.

Another object of the invention is to connect the control circuit to an alert unit such as an indication light set to enable users to clearly determine which electronic device is overloaded. Therefore the overloaded device can be immediately replaced without sending the entire computer system for repairs.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
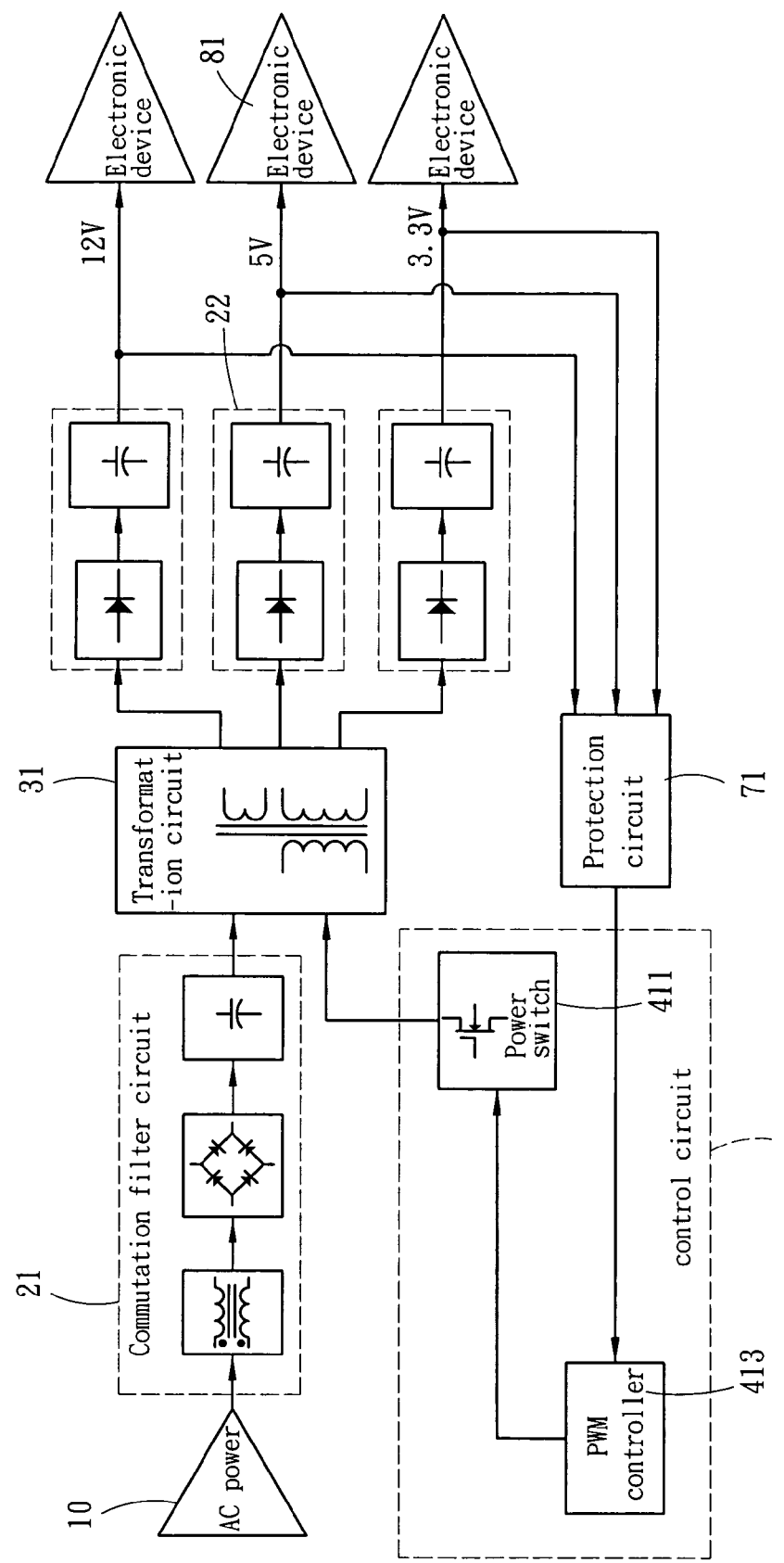
FIG. 1 is a circuit block diagram of a conventional power supply.
Figure 2:
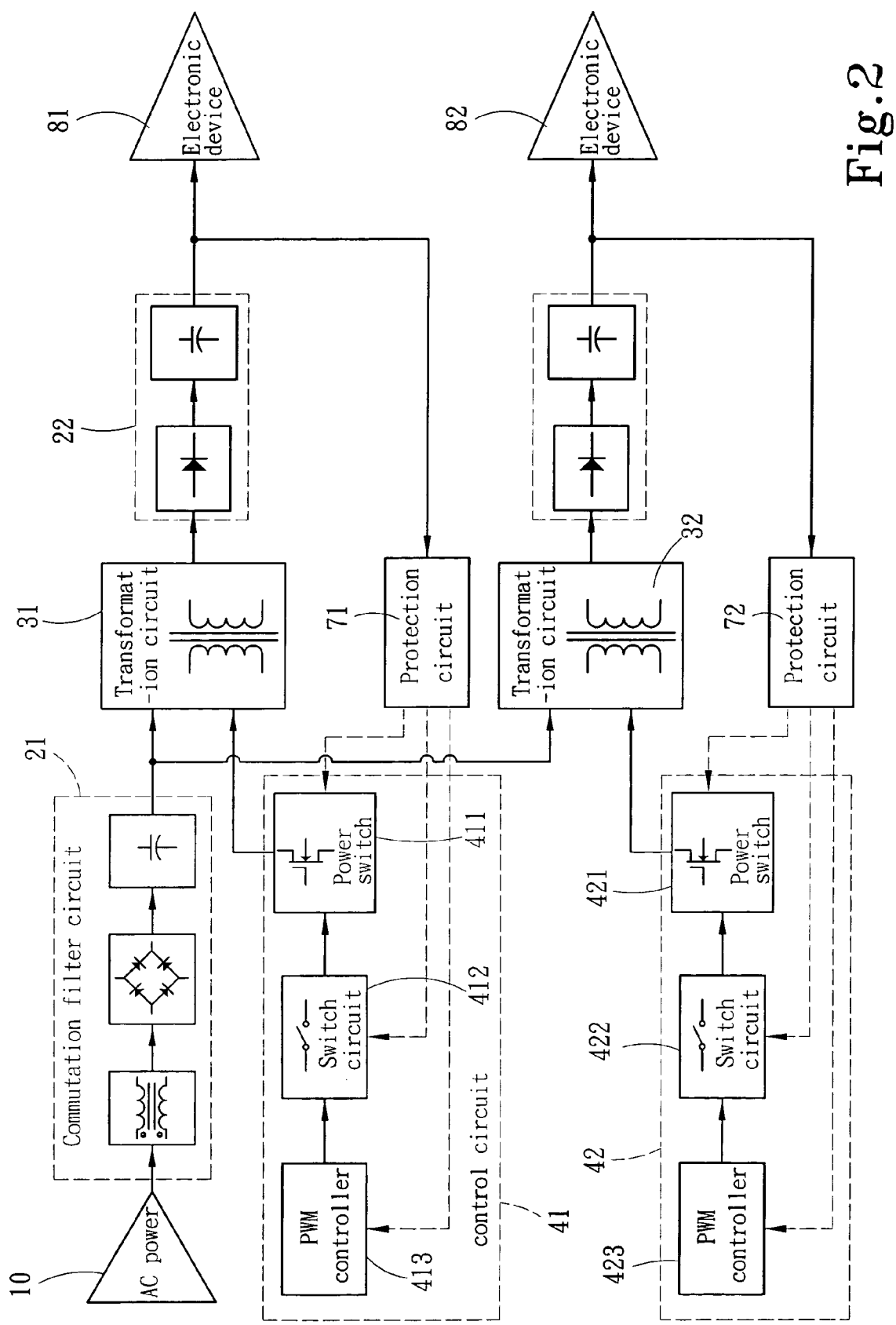
FIGS. 2 and 3 are circuit block diagrams of a first embodiment of the present invention.

Please refer to FIG. 2 for the circuit block diagram of a first embodiment of the invention. The power supply equipped with an independent overload protection mechanism of the invention aims to receive an AC power 10 to pass through commutation filter circuits 21 and 22, control circuits 41 and 42, and transformation circuits 31 and 32 to become a plurality of DC powers to drive at least one electronic device 81, 82 at the rear end. The DC power cords input to the electronic devices 81 and 82 have a power use value captured and sent respectively to protection circuits 71 and 72. The control circuits 41 and 42, and transformation circuits 31 and 32 form two sets or more of combination circuits to output DC power to the electronic devices 81 and 82 at the rear end. Moreover, a power use value is captured from each of the combination circuits that outputs the DC power and sent to the protection circuits 71 and 72. The protection circuits 71 and 72 receive the power use value and determine whether an overload condition exists. In the event that an overload condition exists, the protection circuit 71, 72 sends a protection signal to the control circuit 41, 42 to stop the DC power cord from delivering DC power to the electronic devices 81 and 82 at the rear end so that they are not driven.

The commutation filter circuit circuits 21 and 22 include the commutation filter circuit 21 on the first side of the transformation circuits 31 and 32, and the commutation filter circuit 22 on the second side of the transformation circuits 31 and 32. Depending on the power delivery condition of the power supply, the transformation circuits 31 and 32 can be connected individually to the commutation filter circuit circuits 21 and 22, or jointly share the commutation filter circuit circuits 21 and 22. The control circuits 41 and 42 include respectively a PWM controller 413, 423, and a power circuit 411, 421. Furthermore, switch circuits 412 and 422 may be included to connect to the protection circuits 71 and 72. The protection circuits 71 and 72 can be integrated into a single microprocessor.

Figure 3:
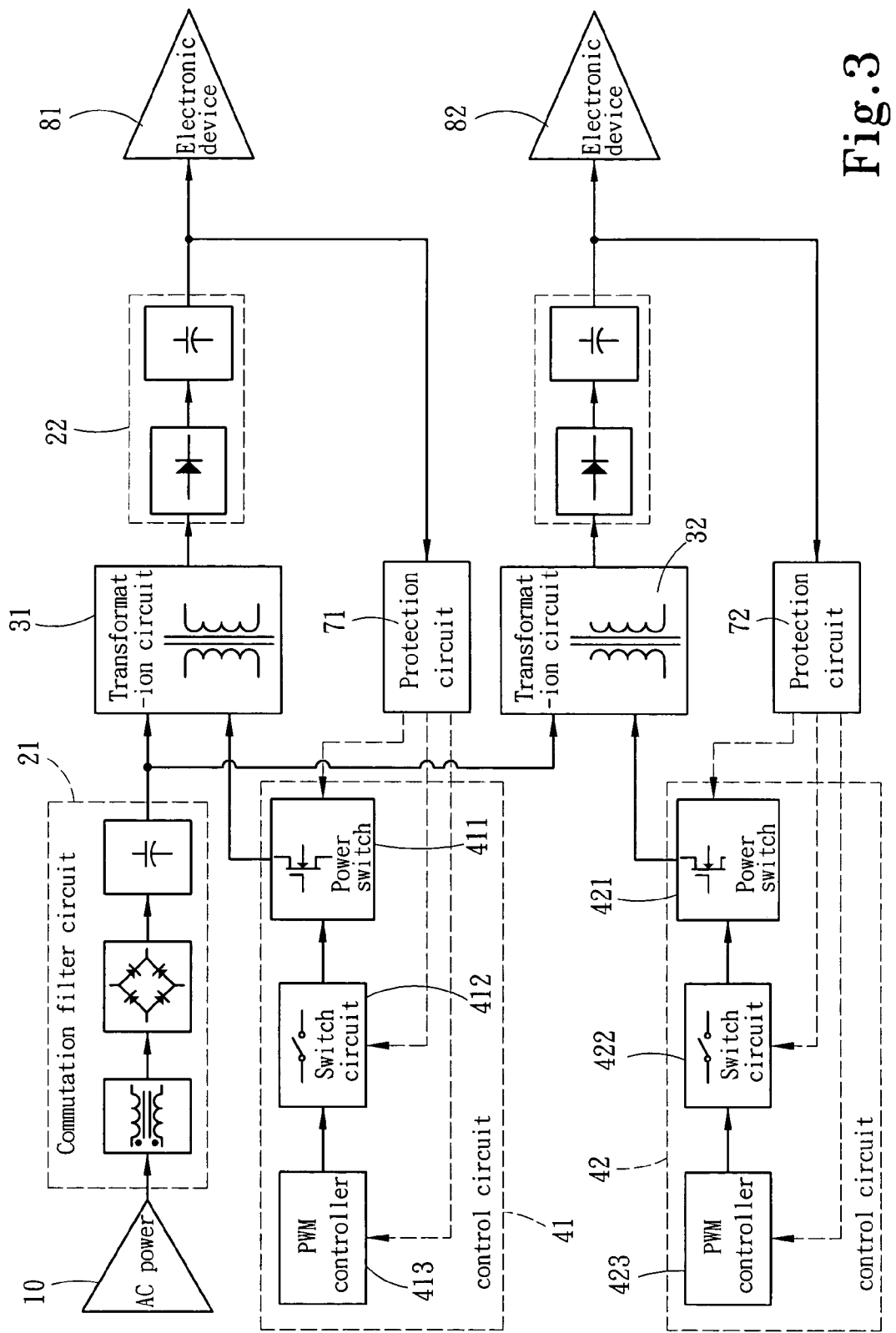

Referring to FIG. 3, in the power supply of the invention that has an independent overload protection mechanism, a power use value is captured from the DC power cords connecting to the electronic devices 81 and 82 and sent to the protection circuits 71 and 72. The protection circuits 71 and 72 compare the captured power use value with a preset overvoltage protection value. In the event that the electronic device 81 is overloaded, the control circuit 41 receives the protection signal output from the protection circuit 71 to stop delivering of the driving signal to the transformation circuit 31 (for instance, the switch circuit 412 shown in the drawing is in an open condition). Hence the driving power for the electronic device 81 also is stopped. If there is no overload condition occurred to another DC power cord, the control circuit 42 is not affected (namely the switch circuit 422 is in a closed condition). Hence electric power is continuously supplied to drive another electronic device 82. Namely, the power supply shuts down only the power for the electronic device 81 which is overloaded, while another electronic device 82 which is not overloaded maintains normal operation. Hence the computer system does not have to be shut down entirely.

Figure 4:
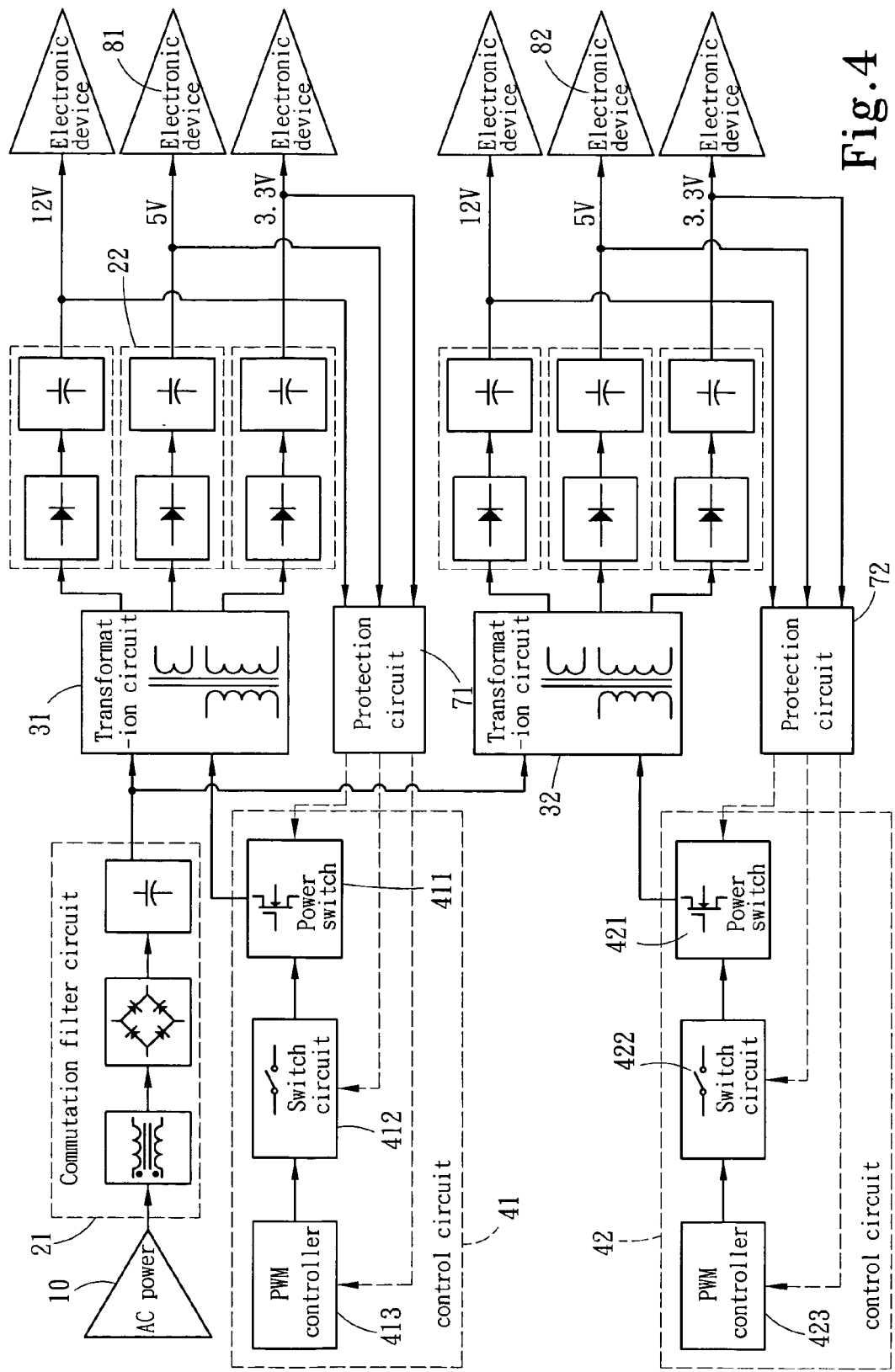
FIG. 4 is a circuit block diagram of a second embodiment of the present invention.

Refer to FIG. 4 for the circuit block diagram of a second embodiment of the invention. It differs from the embodiment shown in FIG. 2 by dividing the output DC power of the transformation circuits 31 and 32 into multiple sets of different voltage levels. According to the present techniques, the DC voltage includes 3.3V, 5V and 12V. All the DC power can be included in the protection mechanism, or only the DC power of 12V is included in the protection mechanism.

Figure 5:
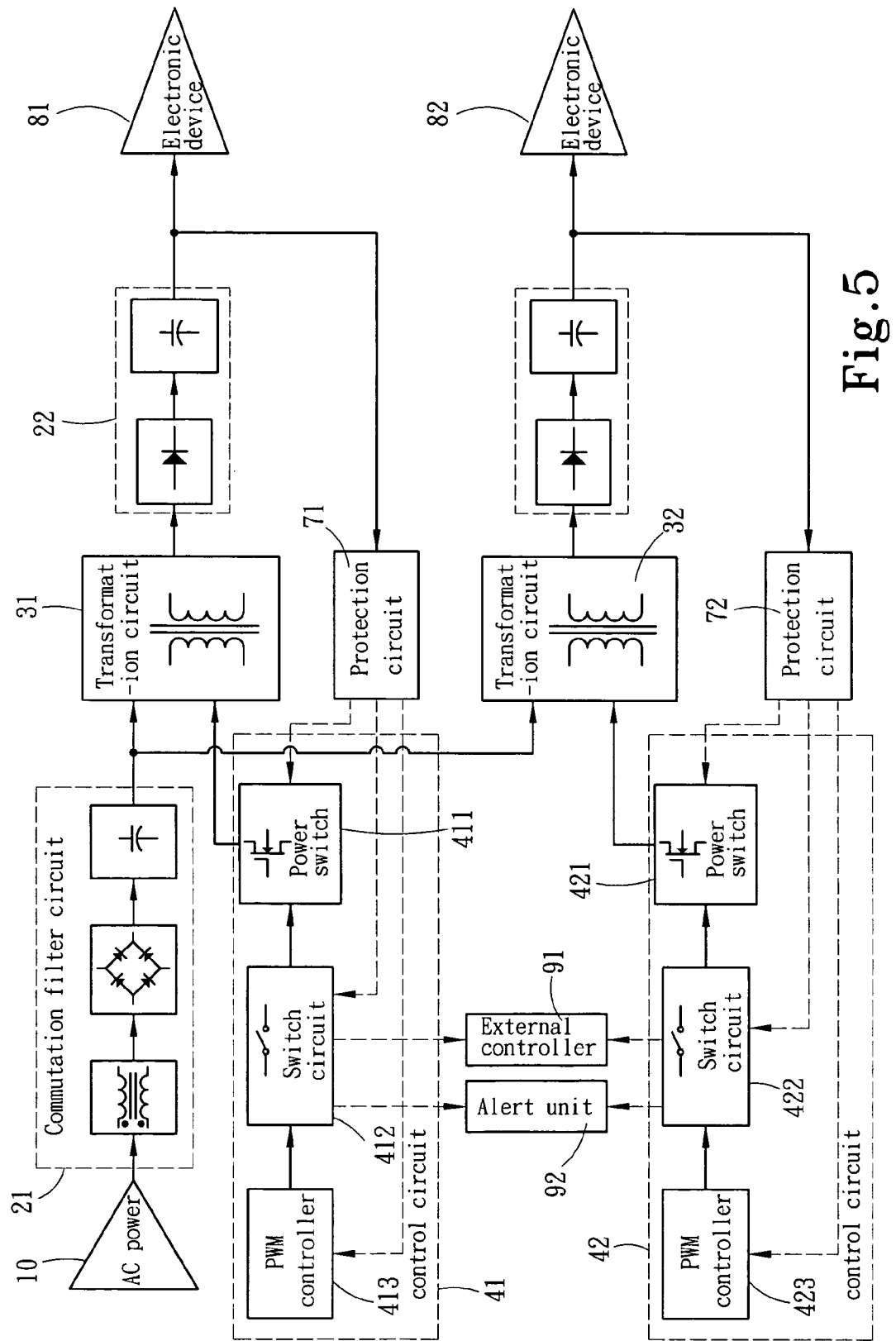
FIG. 5 is a circuit block diagram of a third embodiment of the present invention.

Refer to FIG. 5 for the circuit block diagram of a third embodiment of the invention. Based on the embodiment shown in FIG. 2, an external controller 91 is added to regulate ON/OFF level of the control circuits 41 and 42. Or in the event that the protection circuits 71 and 72 malfunction, and the electronic devices 81 and 82 are overloaded and operate abnormally, the external controller 91 can immediately turn off the control circuits 41 and 42 to stop outputting of the driving signals. In addition, the control circuits 41 and 42 may further be connected to an alert unit 92 which has a LED indication light. In the event that the electronic devices 81 and 82 are overloaded, the control circuits 41 and 42 activate the alert unit 92. Thereby users can be informed which of the electronic devices 81 and 82 is in the overload condition and can take immediate inspection and do replacement more effectively.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power supply equipped with an independent overload protection mechanism that has a single AC power input front end and a plurality DC power output rear end, wherein said front end receives power from said single AC power input which thereafter passes through an internal commutation filter circuit, a control circuit and a transformation circuit and wherein said single AC input is split to become said plurality of DC power outputs to drive at least one electronic device at said rear end, where said rear end comprises a protection circuit to receive a power use value captured from a DC power cord input to the electronic device, wherein the control circuit and the transformation circuit include at least two sets of combination circuits to output the DC power to the electronic device at the rear end, the power use value being captured from each set of the combination circuits that is sent to the protection circuit, the protection circuit receiving the power use value and determining an overload condition to output a protection signal to the control circuit to stop or suspend the DC power on the DC power cord so that the electronic device at the rear end is not driven and wherein the control circuit is connected to an external controller and an alert unit, said external controller regulates on/off level of the control circuit and turns off the control circuit when the electronic device is overloaded or functions abnormally.

2. The power supply equipped with an independent overload protection mechanism of claim 1, wherein the control circuit includes a PWM controller and a power switch.

3. The power supply equipped with an independent overload protection mechanism of claim 2, wherein the control circuit further includes a switch circuit.

4. The power supply equipped with an independent overload protection mechanism of claim 1, wherein the protection circuits can be integrated into a microprocessor.

5. The power supply equipped with an independent overload protection mechanism of claim 1, wherein the DC power output from the transformation circuit is divided into multiple sets of different voltage levels.

* * * * *